(12) United States Patent
Spengler

(10) Patent No.: US 7,286,928 B2
(45) Date of Patent: Oct. 23, 2007

(54) WIRELESS COMMUNICATIONS SYSTEM FOR WORK MACHINE COMPONENTS

(75) Inventor: Philip Carl Spengler, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 11/017,709

(22) Filed: Dec. 22, 2004

(65) Prior Publication Data

US 2006/0136101 A1 Jun. 22, 2006

(51) Int. Cl.
*B60R 16/023* (2006.01)
*G05B 15/00* (2006.01)
*G06F 17/00* (2006.01)

(52) U.S. Cl. .................. 701/115; 701/2; 700/83

(58) Field of Classification Search .............. 701/2, 701/115, 101–103, 114; 700/83–85; 180/167; 710/12
See application file for complete search history.

(56) References Cited

U.S. PATENT DOCUMENTS

| | | | |
|---|---|---|---|
| 5,561,419 A * | 10/1996 | Sasaki et al. | 340/2.1 |
| 5,769,051 A | 6/1998 | Bayron et al. | |
| 5,803,043 A | 9/1998 | Bayron et al. | |
| 6,078,874 A * | 6/2000 | Piety et al. | 702/122 |
| 6,112,152 A | 8/2000 | Tuttle | |
| 6,512,974 B2 * | 1/2003 | Houston et al. | 701/115 |
| 2004/0064221 A1 * | 4/2004 | DePrez et al. | 701/2 |

* cited by examiner

*Primary Examiner*—Willis R. Wolfe, Jr.
(74) *Attorney, Agent, or Firm*—Finnegan, Henderson, Farabow, Garrett & Dunn

(57) ABSTRACT

Systems and methods are disclosed for providing wireless communications between on-board components of a machine, In one embodiment, a system is disclosed that includes a first on-board component associated with a first transducer for wirelessly transmitting first data signals from the first on-board component, and a second on-board component associated with a receiver for receiving the wirelessly transmitted first data signals from the first on-board component. The system may also include a second transducer for wirelessly transmitting second data signals from the second on-board component, wherein the second on-board component generates the second data signals based on the received first data signals and wirelessly transmits the second data signals through the second transducer. In one embodiment, the machine includes a third on-board component that wirelessly transmits third data signals to the second on-board component via the first transducer.

27 Claims, 8 Drawing Sheets

WIRELESS COMMUNICATIONS SYSTEM FOR WORK MACHINE COMPONENTS

TECHNICAL FIELD

The disclosure relates generally to work machine control systems, and more particularly to systems and methods for wirelessly communicating signals between on-board components of a work machine.

BACKGROUND

An important feature in modern work machines (e.g., fixed and mobile commercial machines, such as construction machines, fixed engine systems, marine-based machines, etc.) is the on-board network and associated machine control modules. An on-board network includes many different modules connected to various types of communication links. A machine control module may monitor and/or control one or more components of the work machine. The control module may also receive data from and transmit data to external systems.

Current conventional vehicle control systems include on-board computer modules that collect information from a plurality of sensors during operation of the vehicle. Based on the collected information, an on-board computer module may adjust the operation of one or more on-board modules, such as braking systems, vehicle display devices, etc. As current vehicle systems continue to grow in complexity, additional on-board components are added that require wired data links to communicate. As such, the number of data links implemented in a single vehicle may result in a complex wiring architecture that is difficult to design, manufacture, and/or maintain.

To address some of the concerns associated with wired communications, some vehicle control systems implement wireless communication devices to enable the on-board control system to wirelessly communicate data with off-board systems. One such system is disclosed in U.S. Pat. No. 6,112,152 ("the '112 Patent"), which discloses a vehicle on-board computer that is connected to a plurality of vehicle sensors that provide different types of vehicle operations, such as fuel level, engine temperature, engine speed, throttle positions, etc. The '112 patent includes wireless communication circuitry that is in serial communication with the vehicle on-board computer. The circuitry may transmit and receive data from transponders that are positioned externally to the vehicle. Through this arrangement, vehicle information may be wirelessly passed from the on-board computer to an external transponder. The '112 patent also discloses an arrangement where the external transponder may operate as a transmitting device that provides data to the vehicle on-board computer via wireless communication circuitry.

Although the system described in the '112 patent provides means for wirelessly transmitting and receiving data from a remote system, such as gas stations, toll booths, etc, the '112 patent does not provide an arrangement where data is wirelessly communicated between on-board modules of the vehicle. Methods, systems, and articles of manufacture consistent with certain disclosed embodiments may solve one or more of the problems set forth above.

SUMMARY OF THE INVENTION

Systems and methods are disclosed that provide wireless communications between on-board components of a work machine. In one embodiment, a system is disclosed that includes a first on-board component associated with a first transducer for wirelessly transmitting first data signals from the first on-board component. The disclosed system may further include a second on-board component associated with a receiver for receiving the wirelessly transmitted data signals from the first on-board component and a second transducer for wirelessly transmitting second data signals from the second on-board component. The second on-board component generates the second data signals based on the received first data signals and wirelessly transmits the second data signals through the second transducer.

In another embodiment, a process for providing wireless communications between on-board components of a work machine is disclosed. The disclosed process may include wirelessly transmitting, by a first transducer associated with a first on-board component, first data signals and receiving the first data signals at a receiver associated with a second on-board component. The second on-board component may generate second data signals based on the received first data signals. The second data signals are then wirelessly transmitted through a second transducer associated with the second on-board component.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
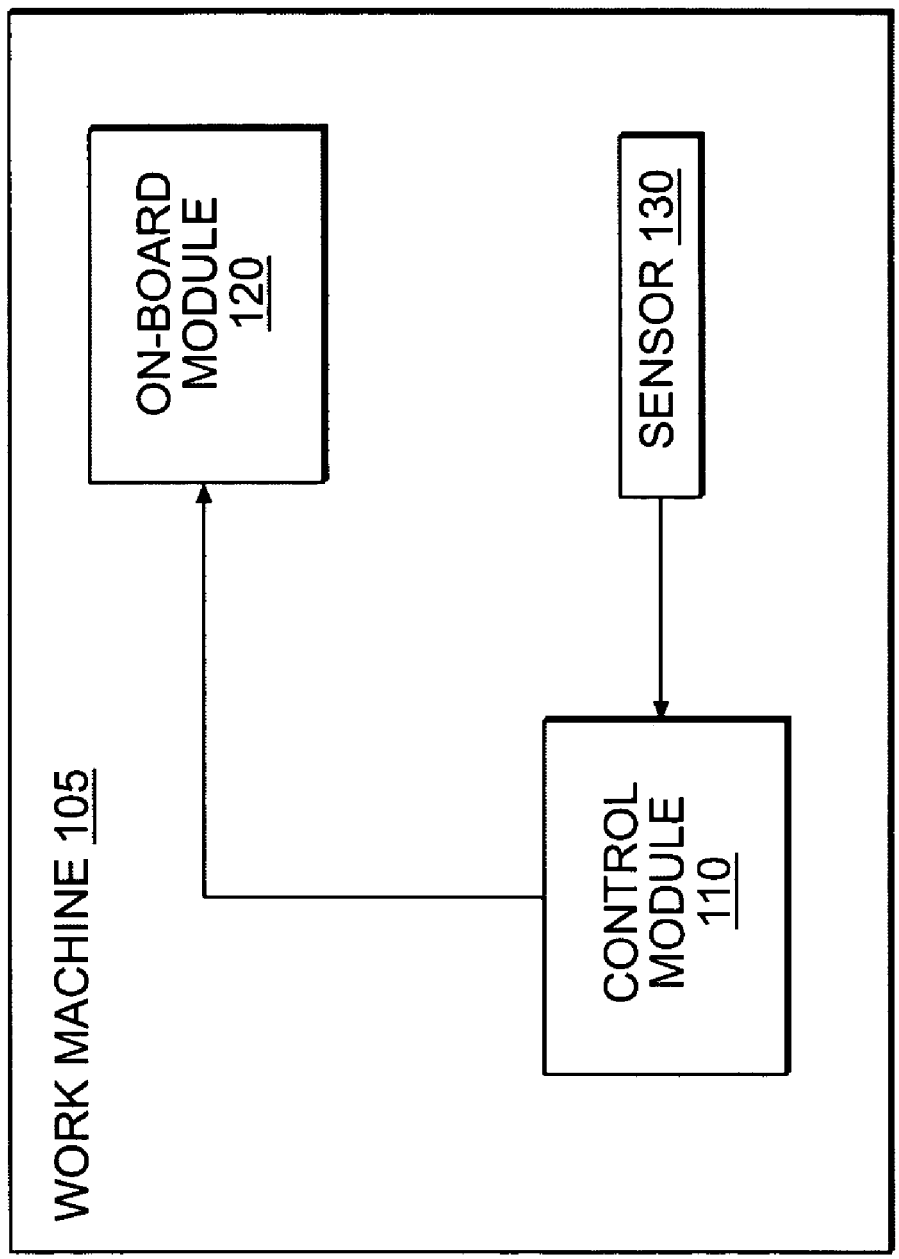
FIG. 1 illustrates a block schematic diagram of an exemplary work machine including wired connections between on-board components consistent with certain disclosed embodiments.

FIG. 1 illustrates a typical work machine environment 100 including a work machine 105 having a control module 110, an on-board module 120, and a sensor 130. Work machine, as the term is used herein, refers to a fixed or mobile machine that performs some type of operation associated with a particular industry, such as mining, construction, farming, etc. and operates between or within work environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment.

A work machine may be driven by a combustion engine or an electric motor.

The types of work machines listed above are exemplary and not intended to be limiting. It is contemplated that environment 100 may implement any type of work machine.

Control module 110 may represent one or more on-board components that control one or more other components of work machine 105.

Control module 110 may include one or more processor devices (e.g., microprocessor, microcontroller, etc.) and one or more memory devices that enable module 110 to perform one or more processes for controlling the one or more components of work machine 105. For example, control module 110 may execute one or more processes that generate control signals for controlling the operation of on-board module 120.

On-board module 120 may represent one or more on-board components that controls and/or is controlled by other components or sub-components. For example, on-board module 120 may be an operator display device controller, a hydraulic pump system, a fuel injection system, a relay device, and any other type of device that work machine 105 may use to facilitate operations of the machine during run time or non-run time conditions (i.e., machine engine running or not running, respectively).

Sensor 130 may represent one or more devices that collect data associated with a particular component of work machine 105 (not shown). For example, sensor 130 may be a temperature sensor that monitors the temperature of a particular component, sub-component, or fluid and/or gas within a component of work machine 105.

In operation of work machine 105, sensor 130 may provide a sensor signal to control module 110 over a wired data link. In response, control module 110 may execute a software process that generates a control signal based on data reflected by the sensor signal. As a result, control module 110 sends the control signal to on-board module 120 over another wired data link to manipulate the operation of that module.

Figure 2:
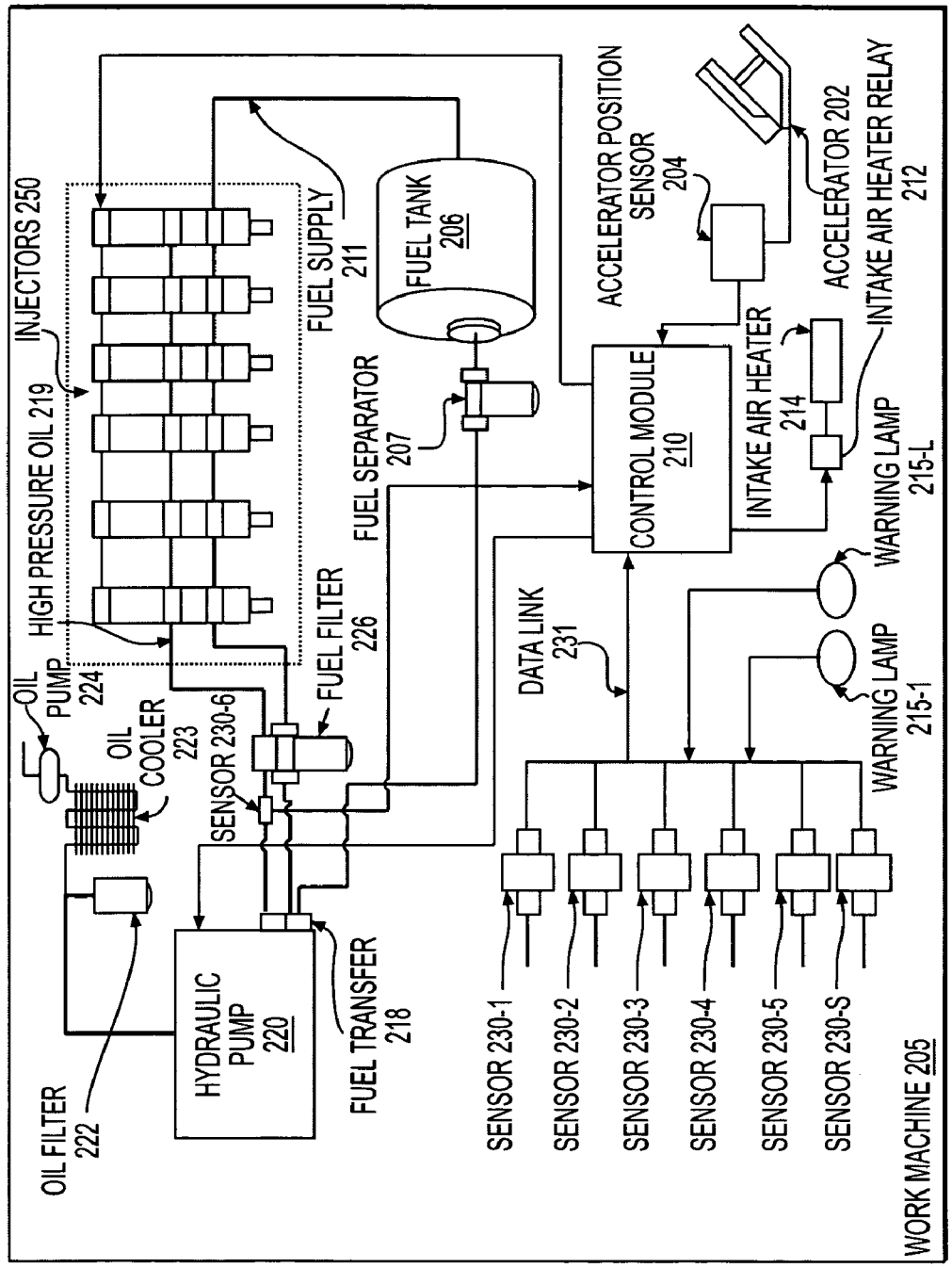
FIG. 2 illustrates another block schematic diagram of an exemplary work machine including wired connections between on-board components consistent with certain disclosed embodiments.

As described, work machine 105 may perform operations based on control signals provided by control module 110. In typical work machines, however, many components and many sensors are implemented to enable the work machine to perform according to design specifications and operator commands. FIG. 2 illustrates an exemplary work machine 205 that reflects the complexities that may be involved in wiring multiple on-board components together in a work machine. In this example, work machine 205 represents a combustion type engine work machine that includes many components. These components operate in a known manner to allow the work machine to perform tasks associated with the machine's designed application (e.g., plow material, shovel material, haul material, etc.) For instance, FIG. 2 shows work machine 205 including an accelerator 202, an accelerator position sensor 204, a fuel tank 206, a fuel separator 207, and a fuel supply line 211 that provides fuel from tank 205 to fuel injectors 250. Fuel injectors 250 may also receive high pressure oil through oil lines 219. Work machine 205 also includes fluid filter devices, such as oil filter 222 and fuel filter 226. An oil cooler 223 and oil pump 224 operate to ensure the proper amount of oil at the correct temperature is being provided to appropriate components of machine 205. Further, work machine 205 may implement hydraulic fluid controlled components that are fed by hydraulic pump 220.

As mentioned, each of the components of work machine 205 perform operations that enable machine 205 to perform work machine related operations, such as travel, manipulate material, etc. To control these operations, work machine 205 implements one or more control modules to provide control signals that guide these components in their operation. For example, the exemplary work machine 205 shown in FIG. 2 includes a control module 210 that interfaces with many other on-board components of work machine 205. For instance, the accelerator 202 may be manipulated by an operator of work machine 205 to control the speed of an engine (not shown) operating within work machine 205. Accelerator position sensor 204 detects the position of accelerator 202 and provides a sensor signal reflecting the position to control module 210 over a wired data link.

Control module 210 may also receive sensor signals from other sensors positioned throughout work machine 205 that monitor different components or conditions of machine 205. For example, sensors 230-1 to 230-S may represent different types of sensors that monitor different components and/or operating conditions of work machine 205. For instance, sensors 230-1 to 230-S may include an oil temperature sensor, a boost pressure sensor, a coolant temperature sensor, an inlet air temperature sensor, an atmospheric temperature sensors, an oil pressure sensor, a fuel level sensor, an injection actuation pressure sensor, an engine speed sensor, a ground travel mechanism sensor, a camshaft position sensor, and any other types of sensor devices that work machine 205 may implement. Sensors 230-1 to 230-S may provide respective sensor signals to control module 210 over wired data links, shown as solid line 231 in FIG. 2.

Further, other types of components may provide control module 210 with information reflecting the condition or status of certain conditions and/or components of work machine 205. For instance, work machine 205 may include warning lamps 215-1 to 215-L that each provide a warning signal to control module 210 reflecting an abnormal condition or operation of a particular component or components of machine 205.

Based on the sensor and/or status signals, control module 210 may generate control signals that control the operation of other on-board components of work machine 205. For instance, control module 210 may send control signals over a wired data line to control an intake air heater relay 212 based on a signal received from an air intake temperature sensor. In response, relay 212 may adjust the operation of an intake air heater 214. In another example, control module 210 may adjust the amount of fuel provided by fuel injectors 250 based on signals provided by accelerator position sensor 204. To do so, control module 210 may send control signals over a wired data link connected to injectors 250. Further, control module 210 may send control signals over a wired data link to adjust the operation of hydraulic pump 220 based on one or more signals provided by sensors 230-1 to 230-S.

Figure 3:
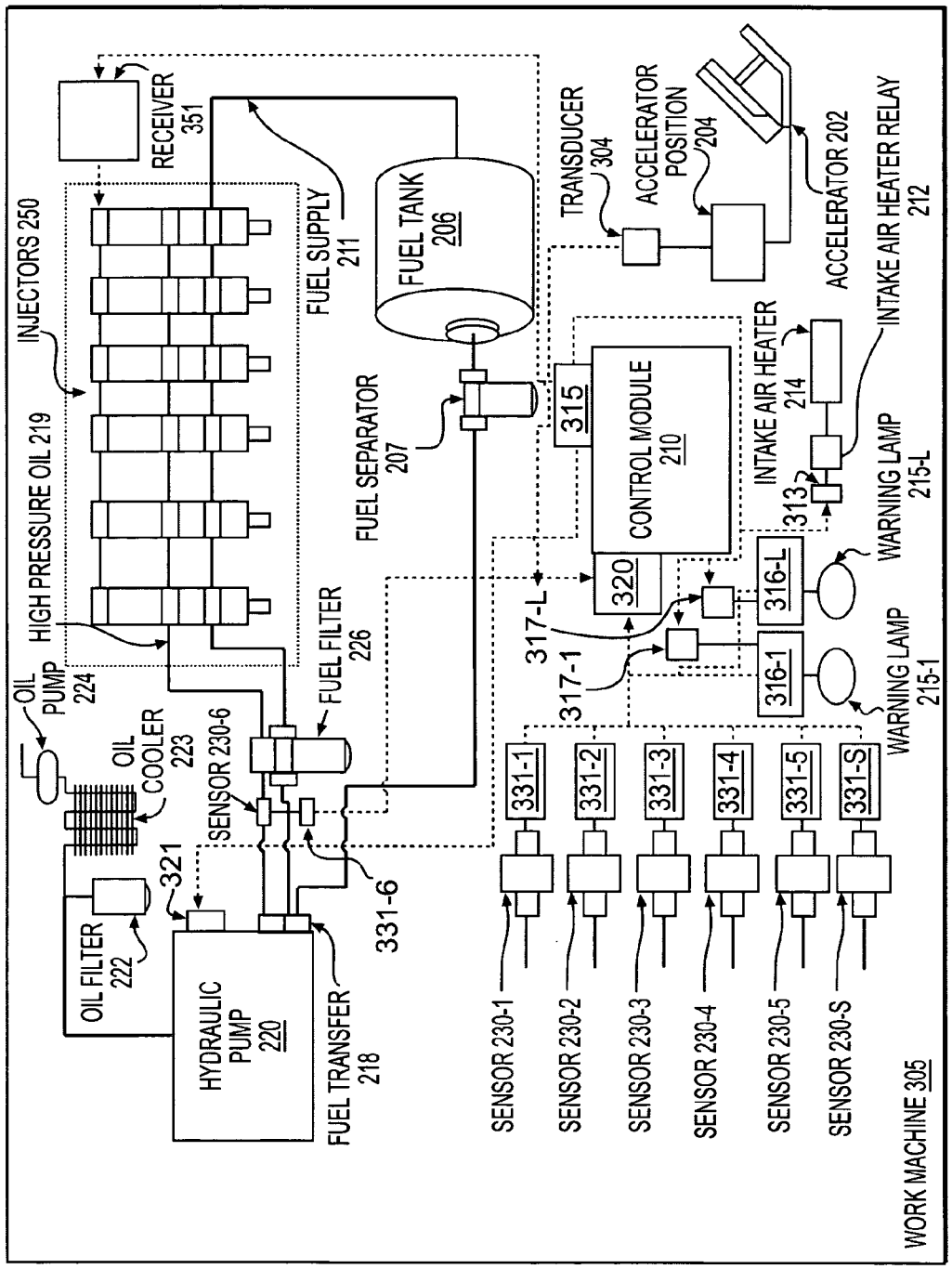
FIG. 3 illustrates another block schematic diagram of an exemplary work machine including wireless data links between on-board components consistent with certain disclosed embodiments.

As described, many wired data links may be implemented in work machine 205 to enable control module 210 to perform work machine controlling functions. Depending on the type of work machine 205, the number of on-board components may vary. As such, the complexities and resources utilized in connecting these components may increase. Accordingly, methods and systems consistent with the disclosed embodiments address these issues by providing wireless communication capabilities between various on-board components of work machine 205. As discussed below, these wireless communication capabilities may be provided as a replacement for or an alternative (e.g., backup) for the wired connections depicted in FIG. 2. FIG. 3 illustrates a work machine 305 consistent with these embodiments. As shown, work machine 305 includes the same components as, and operates in a manner similar to, work machine 205 described above in connection with FIG. 2. As such, the reference numbers shown in FIG. 3 that refer to the same components illustrated in FIG. 2 relate to the same or similar components of a work machine.

One difference between work machine 205 and work machine 305, however, is in the manner by which data is exchanged between components of machine 305. In accordance with one embodiment, work machine 305 enables on-board components to send data to control module 210 over one or more wireless data links (shown as dotted lines in FIG. 3). To facilitate such communications, work machine 305. may implement wireless transmitting transducers that wirelessly transmit data signals from a source component to control module 210. Further, control module 210 may be configured with a wireless receiving device that receives the wireless data signals provided by the transducers, and one or more wireless transmitting transducers that send data signals to target components over a wireless data link.

The wireless data links established by the transducers and receivers implemented by work machine 305 may be associated with different types of wireless technologies. These may include infrared technologies, optical technologies, radio technologies (e.g., RFID), and any other form of wireless technologies that enable on-board components of work machine 305 to exchange data with control module 210.

In one embodiment, sensors 230-1 to 230-S are each connected to a corresponding transducer 331-1 to 331-S that provides wireless communications (shown as dotted lines) to control module 210. As such, when a sensor 230-1 to 230-S is prepared to transmit sensor signals to control module 210, the sensor signals are first transmitted to a corresponding transducer 331-1 to 331-S for conversion to a format compatible with wireless communications.

Subsequently, the transducer 331-1 to 331-S may send the sensor signals over a wireless data link to a receiver 320 that is configured to accept such wireless transmissions from on-board components of work machine 305. As a result, receiver 320 converts the received data signals to their appropriate format and provides the sensor signals to control module 210 for processing. A similar configuration is provided for warning lamps 215-1 to 215-L. Each of these components may also include transducers 316-1 to 316-L that wirelessly transmit the status information generated through warning lamps 215-1 to 215-L to receiver 320.

In response to the received sensor signals, control module 210 may generate control signals that are directed to appropriate on-board components of work machine 305. In one embodiment, control module 210 implements a wireless transmission transducer 315 to convert and wirelessly transmit the control signals to the appropriate on-board components. Each of these components implement wireless receivers that accept and convert the wireless control signals to an appropriate format, and provide the control signals to the on-board component. For instance, fuel injectors 250 may each be associated with a receiver 351 (shown as a single unit) that accepts control signals transmitted (shown as dotted lines) by transducer 315 associated with control module 210. Further, hydraulic pump 220 may implement a receiver 321 that accepts wireless control signals transmitted (shown as dotted lines) by transducer 315. And in similar fashion, intake air heater relay 212 may implement a wireless receiver 313 that accepts control signals transmitted (shown as dotted lines) by transducer 315. Also, warning lamps may implement receivers 317-1 to 317-L to receive wireless data from control module 210. Further, accelerator position sensor 204 may implement a transducer 304 to send wireless sensor signals to control module 210. Although FIG. 3 shows a wired connection between accelerator 202 and accelerator position sensor 204, a wireless communication data link with appropriate transducers and receivers may be implemented between these two components.

Figure 4:
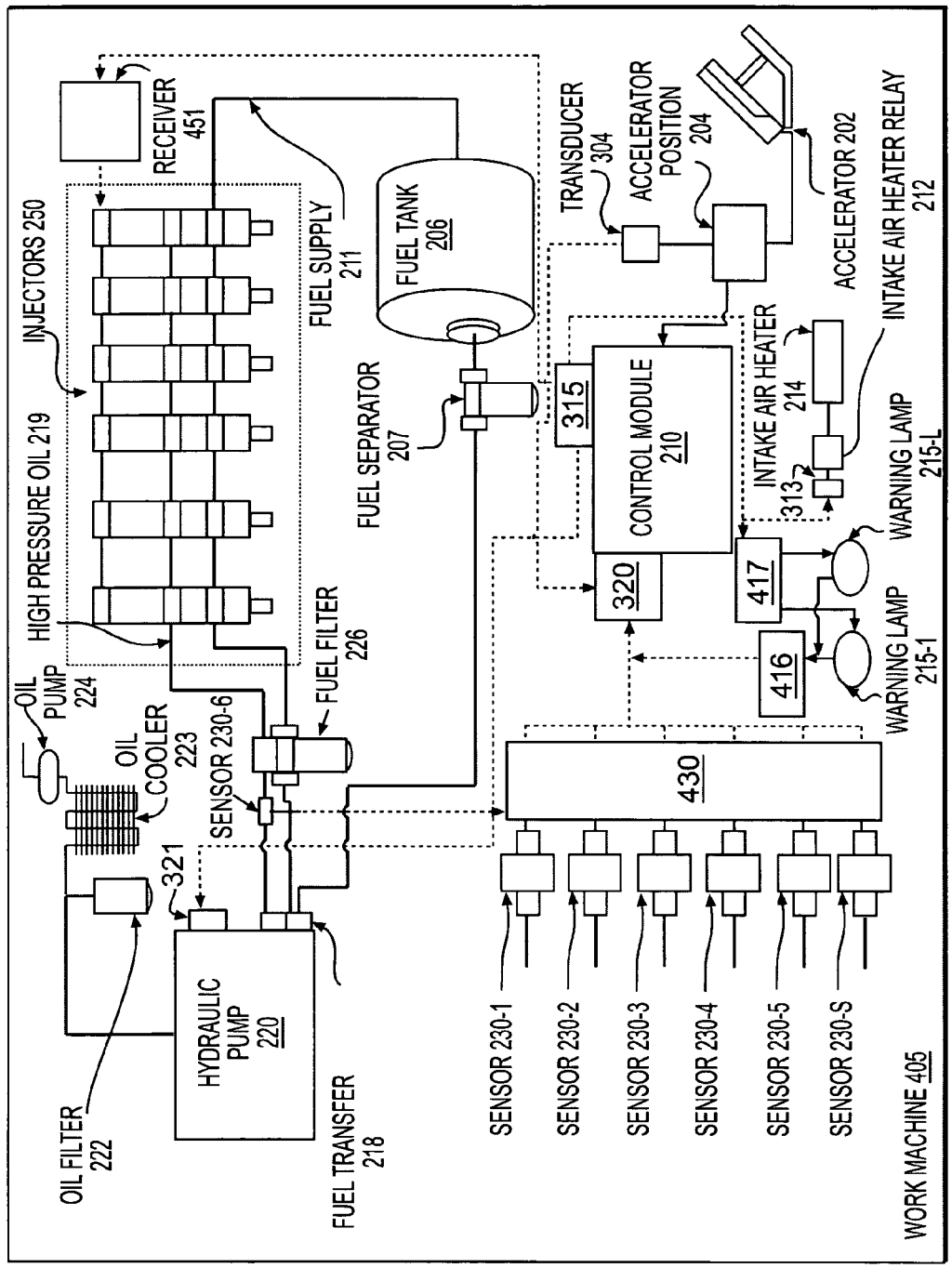
FIG. 4 illustrates a block schematic diagram of another exemplary work machine including wireless data links between on-board components consistent with certain disclosed embodiments.

In another embodiment, on-board components may share transducers and/or receiver for wirelessly exchanging data with other on-board components of a work machine. FIG. 4 illustrates an exemplary work machine 405 consistent with this embodiment. As shown, work machine 405 includes the same components as, and operates in a manner similar to, work machine 305 described above in connection with FIG. 3. As such, the reference numbers shown in FIG. 4 that relate to the same components illustrated in FIG. 3 refer to the same or similar components of a work machine. In this embodiment, however, work machine 405 implements shared transducers and/or receivers. For instance, sensors 230-1 to 230-S may share transducer 430 for wirelessly transmitting sensor signals to receiver 320 associated with control module 210. Further, fuel injectors 250 may share a common receiver 451 that receives control signals wirelessly transmitted by transducer 315 associated with control module 210. Also, warning lamps 215-1 to 215-L may share a common transducer 416 to wirelessly transmit status signals to control module 210 and a common receiver 417 to wireless receiver control signals from control module 210. Accordingly, methods and systems consistent with the disclosed embodiments are not limited to particular configurations between on-board components and wireless communication devices, such as a transducer and receiver.

As described, work machines 305 and 405 implement wireless data links through transducers and receivers, that enable multiple on-board components of work machines 305 and 405 to wirelessly communicate data and/or control signals. Although FIGS. 3 and 4 show certain engine-based components including wireless transducers and/or receivers, the above described embodiments are not limited to those described above in connection with these figures. Any number and types of components of work machines 305 and 405 may implement a transducer and/or receiver for wirelessly exchanging data with other on-board components. For example, FIG. 5 illustrates another example of a work machine 505 that implements wireless communications between on-board components.

Figure 5:
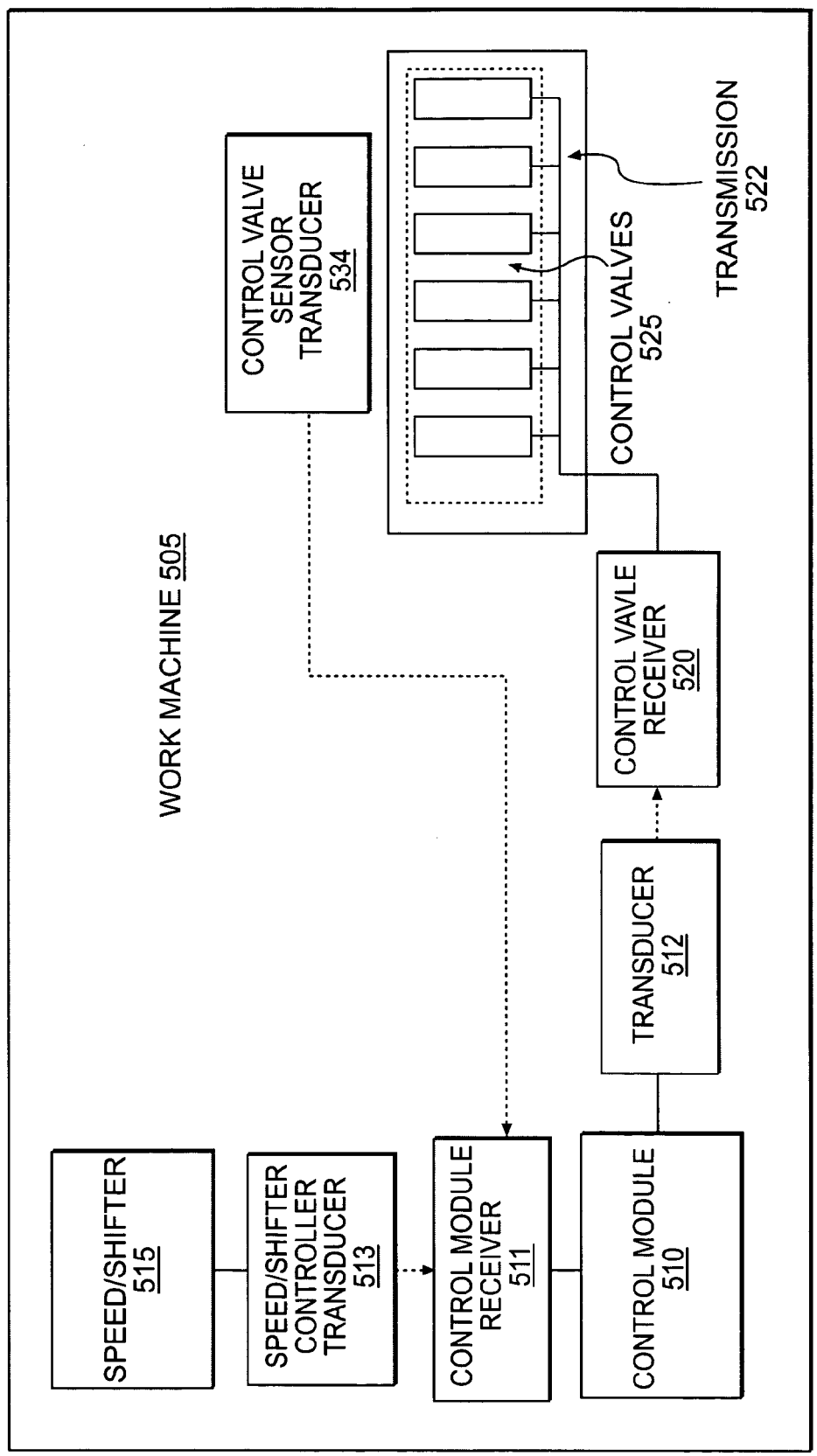
FIG. 5 illustrates a block schematic diagram of yet another exemplary work machine including wireless data links between on-board components consistent with certain disclosed embodiments.

As shown in FIG. 5, work machine 505 includes a control module 510 that may be configured and operates similar to control module 210. In work machine 505, however, control module 510 provides control signals for adjusting the operation of components for a transmission 522 associated with work machine 505. In accordance with certain embodiments, control module 510 may implement a wireless receiver 511 and wireless transducer 512 for communicating with on-board components of work machine 505 to control the operation of transmission 522. For instance, a speed/shifter module 515 may be operated by an operator of work machine 505. Module 515 may provide signals reflecting the operator's commands for adjusting the operation of work machine's 505 transmission 522 (e.g., shifting gears, etc.). Therefore, speed/shifter 515 may implement a transducer 513 that converts and sends the speed/shifter signals to control module 510 via receiver 511. In response, control module 510 may generate control signals for one or more control valves 525 within transmission 522. The control signals are transmitted to a control value receiver 520 by transducer 512. Control valve receiver 520 converts and sends the control signals to the appropriate control valve(s). In another embodiment, control module 510 may generate control signals based on one or more sensor signals provided by control valve sensors (not shown). These sensor signals may be wirelessly transmitted to control module receiver 511 by a control valve sensor transducer 534 implemented by transmission 522.

Accordingly, the disclosed embodiments enable a work machine to provide wireless communications between on-board components. Although the above embodiments are described with respect to sensor components and a corresponding control module, embodiments may be implemented that allow multiple control modules to wirelessly communicate with other types of components. Further, wired data links may be implemented with wireless data links for redundancy or back-up purposes. For instance, FIG. 6 illustrates a block schematic diagram of an exemplary work machine 605 that includes multiple control modules (e.g., ECMs) 610-1 to 610-M, an on-board interface component 620, on-board components 630 and 640, and an off-board interface component 650.

Control modules 610-1 to 610-M may represent control modules that are configured and operate similar to control module 210 described above in connection with FIGS. 2, 3, and 4. That is, control modules 610-1 to 610-M may be configured to control the operations of at least one other on-board component by generating one or more control signals. Further, control modules 610-1 to 610-M may also exchange data with each other to perform their respective control processes. On-board interface component 620 may represent a processing device that interconnects multiple data links implemented within work machine 605, such as data links 621, 622, 623, and 624. These data links may or may not be similar in format and protocol. On-board components 630 and 640 may each reflect one or more on-board modules that may be controlled by or control other on-board components of work machine 605. Off-board interface component 650 may reflect a device that provides off-board communications between work machine 605 and one or more off-board systems, such as a computer system, another work machine, an operator controlled radio unit, etc. Off-board interface component 650 may receive data from an off-board system for transmission to a target on-board component, such as one or more control modules 610-1 to 610-M through interface component 620.

Each of the on-board components of work machine 605 may also employ wireless communication devices for establishing wireless data links with other components. For example, the on-board components may include a transducer and/or a receiver 660 for sending and receiving wireless data signals. Through this arrangement, multiple control modules (i.e., 610-1 to 610-M) may wirelessly exchange data. Alternatively, control modules 610-1 to 610-M may exchange data through wired data link 623 concurrently with, or in place of, the wireless communications. Similarly, interface component 620 may wirelessly exchange data with on-board components 630, 640, and off-board interface component 650, and/or communicate with these components through wired data links 621, 622, and 624, respectively. Through this arrangement, work machine 605 may employ the wired data links and/or wireless data links as back-up communication means in the event one of the data links experiences a fault or a communication failure. Thus, in the event an on-board component determines that communicating over a wireless data link cannot be performed, the on-board component may be configured to use a wired data link (e.g., data links 621, 622, 623, and/or 624) to exchange data with another on-board component.

Figure 6:
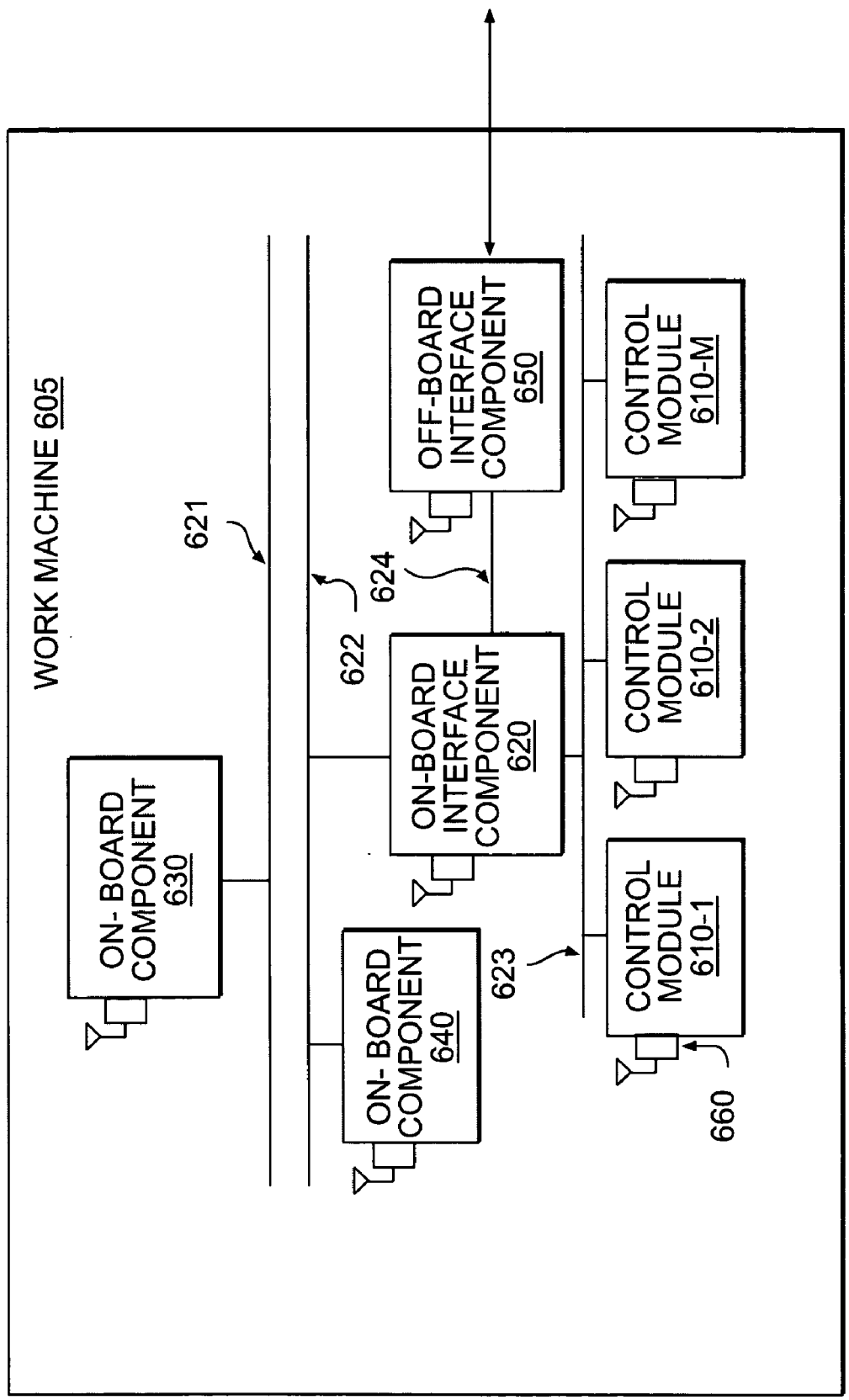
FIG. 6 illustrates a block schematic diagram of another exemplary work machine including wireless and wired data links between on-board components consistent with certain disclosed embodiments.

Although FIG. 6 shows work machine 605 implemented with wired data links, work machine 605 may be implemented without some or all wired data links 621, 622, 623, and/or 624 to allow the machine to facilitate inter-module wireless communications. Additionally, although not shown in FIG. 6, other types of components may be implemented that include a transducer and/or receiver for wirelessly exchanging data with other on-board components, such as sensors, relays, user interface devices, etc.

Figure 7:
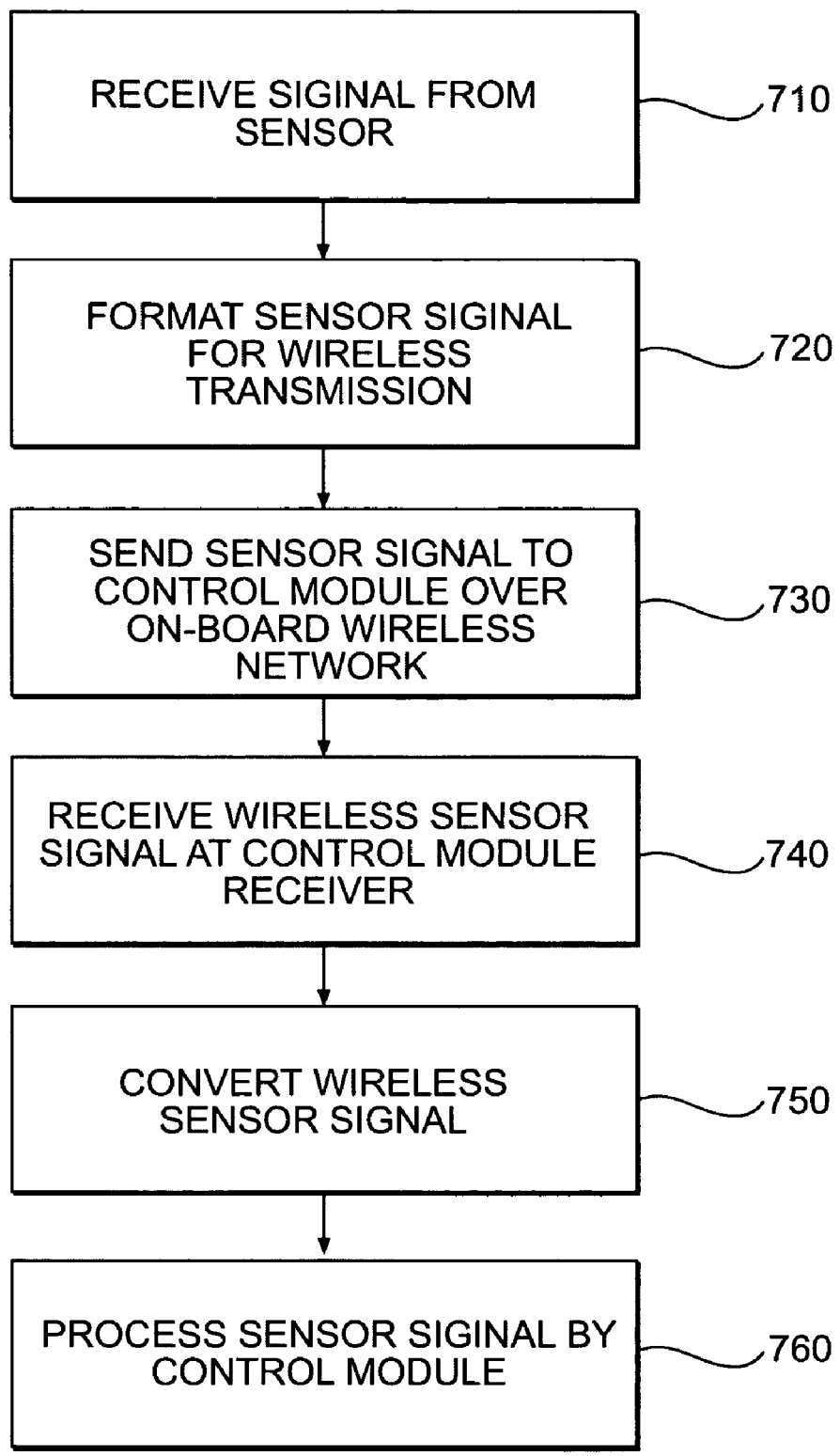
FIG. 7 illustrates a flow chart of an exemplary sensor signal receiving process consistent with certain disclosed embodiments.

As explained, the disclosed embodiments enable a work machine to provide on-board wireless communications between components of the machine. FIG. 7 illustrates an exemplary sensor signal receiving process consistent with certain disclosed embodiments. Initially, a sensor device equipped with a transducer may generate a sensor signal and provide that signal to the transducer (Step 710). The transducer formats the sensor signal for wireless transmission (Step 720) and transmits the signal to a control module over an on-board wireless network (Step 730). A receiver associated with the control module receives the wireless sensor signal (Step 740) and converts the signal to an appropriate format for processing by the control module (Step 750). The control module may then process the sensor signal to generate one or more control signals for transmission to one or more other components of the work machine (Step 760).

Figure 8:
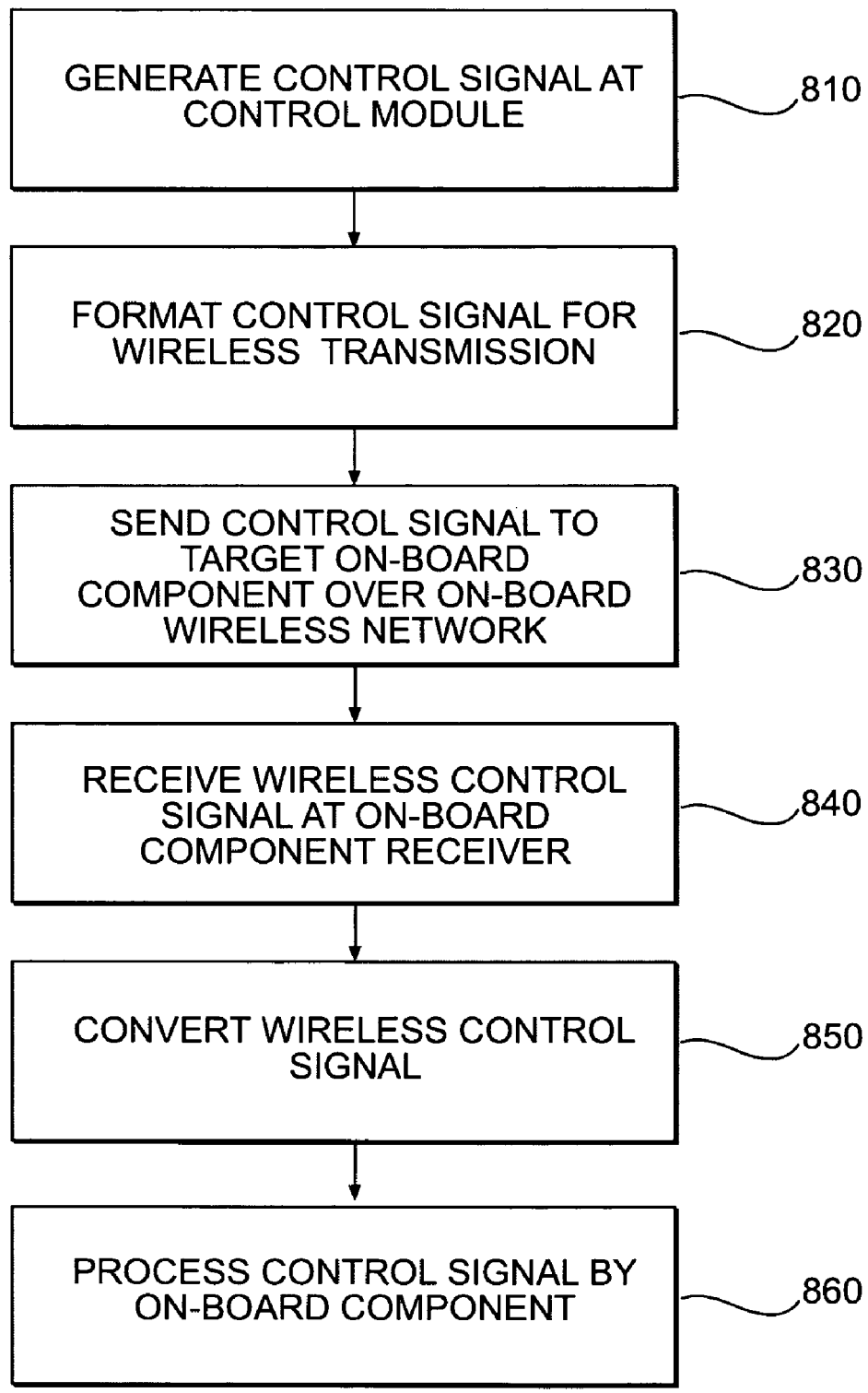
FIG. 8 illustrates a flow chart of an exemplary control module transmission process consistent with certain disclosed embodiments.

FIG. 8 illustrates an exemplary control module transmission process consistent with certain disclosed embodiments. As explained, based on a received sensor signal, the control module may generate a control signal (Step 810). The control module may send the control signal to a transducer that formats the signal for transmission over an on-board wireless network (Step 820). The transducer then sends the formatted control signal to a target on-board component over the wireless network (Step 830). A receiver associated with the target on-board component receives the wireless control signal (Step 840) and converts the signal to a format compatible with the target on-board component (Step 850). The on-board component may then process the control signal to perform some process based on the information included in the control signal, such as adjusting hydraulic fluid pressure to a sub-component, adjusting the fuel supply to a sub-component, etc. (Step 860).

INDUSTRIAL APPLICABILITY

Methods and systems consistent with the disclosed embodiments enable a work machine to provide wireless communications between on-board components. The disclosed arrangements enable the work machine to be configured with less wires than a typical work machine, thus reducing the complexity of the machine's wire harness. In other embodiments, a work machine may employ both wired and wireless data links to provide inter-component communications.

In one embodiment, a work machine including a control module is equipped with a receiver and transducer for receiving and sending wireless data signals. Further, the work machine includes other on-board components, such as sensors and on-board modules, that are also equipped with transducers and/or receivers for wirelessly exchanging data with the control module. For instance, the sensors may wirelessly provide sensor signals to the control module through respective transducers. The control module receives the sensor signals through a receiver and, in turn, generates corresponding control signals. The control module then wirelessly transmits the control signals to one or more target on-board components through a transducer. The target on-board components may receive the control signals through a wireless receiver and, in turn, process the signals to adjust their operations or the operations of other on-board components.

In other embodiments, on-board components may share a common transducer and/or receiver for wirelessly exchanging data with other on-board components. Thus, on-board components may be grouped based on their functionalities to share transducers and/or receiver. Alternatively, the work machine may employ dedicated transducers and/or receivers for use by certain on-board components based on their physical location within the work machine.

Accordingly, the disclosed embodiments are not limited to any particular arrangements of wireless devices and corresponding on-board components for implementing wireless networks within the work machine.

As explained, the disclosed embodiments include an arrangement where the work machine may implement an off-board interface component that exchanges data with an off-board system. The off-board interface component may be equipped with a transducer and/or receiver for wirelessly exchanging data with other on-board components, such as an on-board interface component. Through this arrangement, the off-board interface component may receives data updates (e.g., flash file updates), command signals (e.g., engine parameter adjustments or data values, etc.) and other types of data messages from the off-board system. The off-board interface component may leverage its transducer to wirelessly transmit the data updates, command signals, etc., to a target on-board component over an on-board wireless network.

Other embodiments, features, aspects, and principles of the disclosed exemplary systems may be implemented in various environments and are not limited to work site environment. For example, any type of work machine may implement the disclosed embodiments to provide on-board wireless communications between components. Also, any type of wireless technology may be employed by the disclosed embodiments to facilitate the wireless exchange of data between on-board components. Additionally, although embodiments disclosed above and illustrated in the figures include transducers and/or receivers associated with corresponding on-board components, one, some, or all of these on-board components may be configured to include a transducer and/or receiver for wirelessly exchanging data with other on-board components of the work machine. Further, the processes disclosed herein are not inherently related to any particular system and may be implemented by a suitable combination of electrical-based components. Embodiments other than those expressly described herein will be apparent to those skilled in the art from consideration of the specification and practice of the disclosed systems. It is intended that the specification and examples be considered as exemplary only, with the true scope of the invention being indicated by the following claims.

What is claimed is:

1. A system for providing wireless communications between on-board components of a machine, comprising:
a first on-board component associated with a first transducer for wirelessly transmitting first data signals from the first on-board component; and
a second on-board component associated with a receiver for receiving the wirelessly transmitted first data signals from the first on-board component and a second transducer for wirelessly transmitting second data signals from the second on-board component,
wherein the second on-board component generates the second data signals based on the received first data signals and wirelessly transmits the second data signals through the second transducer, and
wherein the machine includes a third on-board component that wirelessly transmits third data signals to the second on-board component via the first transducer.

2. The system of claim 1, wherein the second on-board component wirelessly transmits the second data signals through the second transducer to a fourth on-board component of the machine.

3. The system of claim 2, wherein the fourth on-board component receives the second data signals through a receiver configured to receive wireless data signals, and performs a process based the second data signals.

4. The system of claim 1, wherein the first on-board component is at least one of a sensor, a control module for controlling the operation of other on-board components, an interface component that receives data signals from an off-board system remote from the machine, and a machine component configured to perform a particular machine operation.

5. The system of claim 1, wherein the second on-board component is at least one of a control module for controlling the operation of other on-board components and an interface component that receives signals from an off-board system remote from the machine.

6. The system of claim 1, wherein the first on-board component is a sensor and the second on-board component is a control module that controls the operations of other on-board components of the machine based on the first data signals.

7. The system of claim 1, wherein the second data signals are control signals for controlling the operation of a target on-board component and wherein the second transducer wirelessly transmits the control signals to the target on-board component.

8. The system of claim 7, wherein the target on-board component adjusts its operations based on the control signals wirelessly sent by the second transducer.

9. The system of claim 1, wherein the machine includes wireless and wired data links interconnecting the first and second on-board components, and wherein the first on board component is configured to transmit the first data signals to the second on board component over the wired data link and wirelessly transmit the first data signals to the second on board component over the wireless data link via the first transducer.

10. The system of claim 9, wherein the first on-board component transmits the first data signals to the second on-board component over the wired data link when the first data signals cannot be transmitted to the second on-board component over the wireless data link.

11. The system of claim 1, wherein the machine includes a fourth on-board component having a third transducer for wirelessly transmitting fourth data signals to the second on-board component.

12. The system of claim 11, wherein the second on-board component generates the second data signals based on at least one of the first, third, and fourth data signals wirelessly transmitted by the first, third, and fourth on-board components, respectively.

13. The system of claim 1, wherein the machine is a commercial truck.

14. A method for providing wireless communications between on-board components of a machine, wherein the machine includes wireless and wired data links interconnecting a first set of on-board components and a second on-board component, the method comprising:
- wirelessly transmitting, by a first transducer associated with the first set of on-board components, first data signals;
- receiving the first data signals at a receiver associated with the second on-board component;
- generating, by the second on-board component, second data signals based on the received first data signals;
- wirelessly transmitting the second data signals through a second transducer associated with the second on-board component;
- transmitting by one of the first on-board components in the first set, at least one of the first data signals to the second on-board component over the wired data link; and
- wirelessly transmitting, by the one first on-board component, at least one of the first data signals to the second on-board component over the wireless data link via the first transducer.

15. The method of claim 14, wherein wirelessly transmitting the second data signals includes:
- wirelessly transmitting the second data signals through the second transducer to a third on-board component of the machine.

16. The method of claim 15, further including:
- receiving the second data signals through a receiver associated with the third on-board component and configured to receive wireless data signals; and
- performing, by the third on-board component, a process based the second data signals.

17. The method of claim 14, wherein the set of first on-board components includes at least one of a sensor, a control module for controlling the operation of other on-board components, an interface component that receives data signals from an off-board system remote from the machine, and a machine component configured to perform a particular machine operation.

18. The method of claim 14, wherein the second on-board component is at least one of a control module for controlling the operation of other on-board components and an interface component that receives signals from an off-board system remote from the machine.

19. The method of claim 14, wherein the set of first on-board components includes a sensor and the second on-board component is a control module that controls the operations of other on-board components of the machine based on the first data signals.

20. The method of claim 14, wherein the second data signals are control signals for controlling the operation of a target on-board component and wherein the method further includes:
- wirelessly transmitting, by the second transducer, the control signals to the target on-board component.

21. The method of claim 20, further including:
- adjusting, by the target on-board component, operations of the target on-board component based on the control signals wirelessly sent by the second transducer.

22. The method of claim 14, wherein the machine is a commercial truck.

23. The method of claim 14, further including:
- transmitting, by the one first on-board component, the first data signals to the second on-board component over the wired data link when the first data signals cannot be transmitted to the second on-board component over the wireless data link.

24. The method of claim 14, wherein the machine includes a third on-board component associated with a third transducer, and the method further includes:
- wirelessly transmitting third data signals to the second on-board component by the third transducer.

25. The method of claim 24, further including:
- generating, by the second on-board component, the second data signals based on at least one of the first and third data signals wirelessly transmitted by the first set of on-board components and the third on-board component, respectively.

26. The method of claim 14, wherein the machine includes a third on-board component, and the method further includes:
- wirelessly transmitting, by the third on-board component, third data signals to the second on-board component via the first transducer.

27. A system for providing wireless communications between on-board components of a machine, comprising:
- first means located on the work machine for wirelessly transmitting first data signals from a first on-board component; and
- a second on-board component having a second means located on the machine for receiving the wirelessly transmitted first data signals and for wirelessly transmitting second data signals, wherein
- the machine includes wireless and wired data links interconnecting the first and second on-board components, and wherein the first on-board component is configured to transmit the first data signals to the second on-board component over the wired data link and wirelessly transmit the first data signals to the second on-board component over the wireless data link.

* * * * *